United States Patent [19]
Nishihara et al.

[11] Patent Number: 5,589,815
[45] Date of Patent: Dec. 31, 1996

[54] SYSTEM FOR DETERMINING PNEUMATIC TIRE PRESSURE FOR MOTOR VEHICLE

[75] Inventors: Takashi Nishihara; Toru Ikeda; Osamu Yano; Shuji Shiraishi, all of Wako, Japan

[73] Assignee: Honda Giken Kogyo Kabushiki Kaisha, Tokyo, Japan

[21] Appl. No.: 329,941

[22] Filed: Oct. 26, 1994

[30] Foreign Application Priority Data

Nov. 2, 1993 [JP] Japan .................. 5-274521

[51] Int. Cl.$^6$ .................................................. B60C 23/00
[52] U.S. Cl. ........................ 340/444; 340/442; 340/445; 180/197; 73/146.5
[58] Field of Search ..................... 340/442, 443, 340/444, 445, 671; 180/197; 73/146.5

[56] References Cited

U.S. PATENT DOCUMENTS

| | | | |
|---|---|---|---|
| 3,760,350 | 9/1973 | Johnson | 340/442 |
| 5,192,929 | 3/1993 | Walker et al. | 340/444 |
| 5,218,862 | 6/1993 | Hurrell, II et al. | 340/444 |
| 5,252,946 | 10/1993 | Walker et al. | 340/444 |
| 5,274,355 | 12/1993 | Galan | 340/444 |
| 5,327,346 | 7/1994 | Goodell | 340/444 |
| 5,343,741 | 9/1994 | Nishihara et al. | 340/444 |
| 5,345,217 | 9/1994 | Prottey | 340/444 |

FOREIGN PATENT DOCUMENTS

| | | |
|---|---|---|
| 0554131 | 2/1993 | European Pat. Off. . |
| 3236520 | 10/1982 | Germany . |
| 56-10202 | 3/1981 | Japan . |
| 63-305011 | 12/1988 | Japan . |

*Primary Examiner*—Jeffrey Hofsass
*Assistant Examiner*—Davetta Woods
*Attorney, Agent, or Firm*—Armstrong, Westerman, Hattori, McLeland & Naughton

[57] ABSTRACT

The rotational speed difference between rotational speeds of front and rear road wheels of a motor vehicle is weighted by a first ratio, and the difference between the rotational speed difference between rotational speeds of front left and right road wheels and an average signal of reference steering angle or between the rotational speed difference between rotational speeds of rear left and right road wheels and the average signal of reference steering angle is weighted by a second ratio. A sum signal representative of the sum of the rotational speed difference weighted by the first ratio and the difference weighted by the second ratio is used to determine a pneumatic tire pressure reduction highly accurately even when running conditions of the motor vehicle change such as when the motor vehicle makes a turn.

3 Claims, 2 Drawing Sheets

SYSTEM FOR DETERMINING PNEUMATIC TIRE PRESSURE FOR MOTOR VEHICLE

BACKGROUND OF THE INVENTION

1. Field of the Invention

The present invention relates to a system for determining the pressure of a pneumatic tire for use on a motor vehicle such as an automobile, and more particularly to an improvement in such a pneumatic tire pressure determining system for determining the pressure of a pneumatic tire highly accurately.

2. Description of the Prior Art

Known pneumatic tire pressure determining systems are disclosed in Japanese patent publication No. 56-10202 and Japanese laid-open patent publication No. 63-305011, for example.

The pneumatic tire pressure determining system disclosed in Japanese laid-open patent publication No. 56-10202 has pressure sensors attached to respective road wheels. The pneumatic tire pressure determining system disclosed in Japanese laid-open patent publication No. 63-305011 detects the angular velocities of road wheels, and compares the angular velocity of each of the road wheels with the average value of the angular velocities of the road wheels for determining a reduction in the pneumatic pressure in any of the tires of the road wheels.

The pneumatic tire pressure determining system disclosed in the latter publication cannot determine the pneumatic tire pressures highly accurately and hence is not highly reliable. Specifically, because only the angular velocities of the road wheels are used as a reference value, the difference between radii of curvature of paths of the road wheels cannot be calculated while the motor vehicle is making a turn. The steering system of the motor vehicle tends to suffer a mechanical error even when the motor vehicle is running straight. Consequently, the disclosed pneumatic tire pressure determining system can determine a reduction in the pneumatic tire pressure only in a certain range of motor vehicle motions.

SUMMARY OF THE INVENTION

It is therefore an object of the present invention to provide a pneumatic tire pressure determining system capable of detecting the pressure of a pneumatic tire highly accurately in such a range of motor vehicle motions which has prevented the conventional pneumatic tire pressure determining system from determining a reduction in the pneumatic tire pressure.

According to the present invention, there is provided a system for determining a pneumatic tire pressure of road wheels on a motor vehicle, comprising first differential speed means for detecting a front rotational speed difference between rotational speeds of front left and right road wheels of the motor vehicle, second differential speed means for detecting a rear rotational speed difference between rotational speeds of rear left and right road wheels of the motor vehicle, running condition detecting means for detecting a running condition of the motor vehicle, reference differential speed calculating means for calculating a reference rotational speed difference between rotational speeds of the front left and right road wheels based on an output signal from the third means, first pressure reduction determining means for comparing the front rotational speed difference and the rear rotational speed difference to determine a pneumatic tire pressure reduction of the front left and right road wheels or the rear left and right road wheels, second pressure reduction determining means for comparing the front rotational speed difference or the rear rotational speed difference and the reference rotational speed difference to determine a pneumatic tire pressure reduction of one of the front left and right road wheels or the rear left and right road wheels, and final pressure reduction determining means for determining a pneumatic tire pressure reduction from output signals from the first pressure reduction determining means and the second pressure reduction determining means based on a first ratio in the first pressure reduction determining means and a second ratio in the second pressure reduction determining means.

The system may further comprise ratio varying means for varying the first ratio and the second ratio based on the running condition detected by the running condition detecting means.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
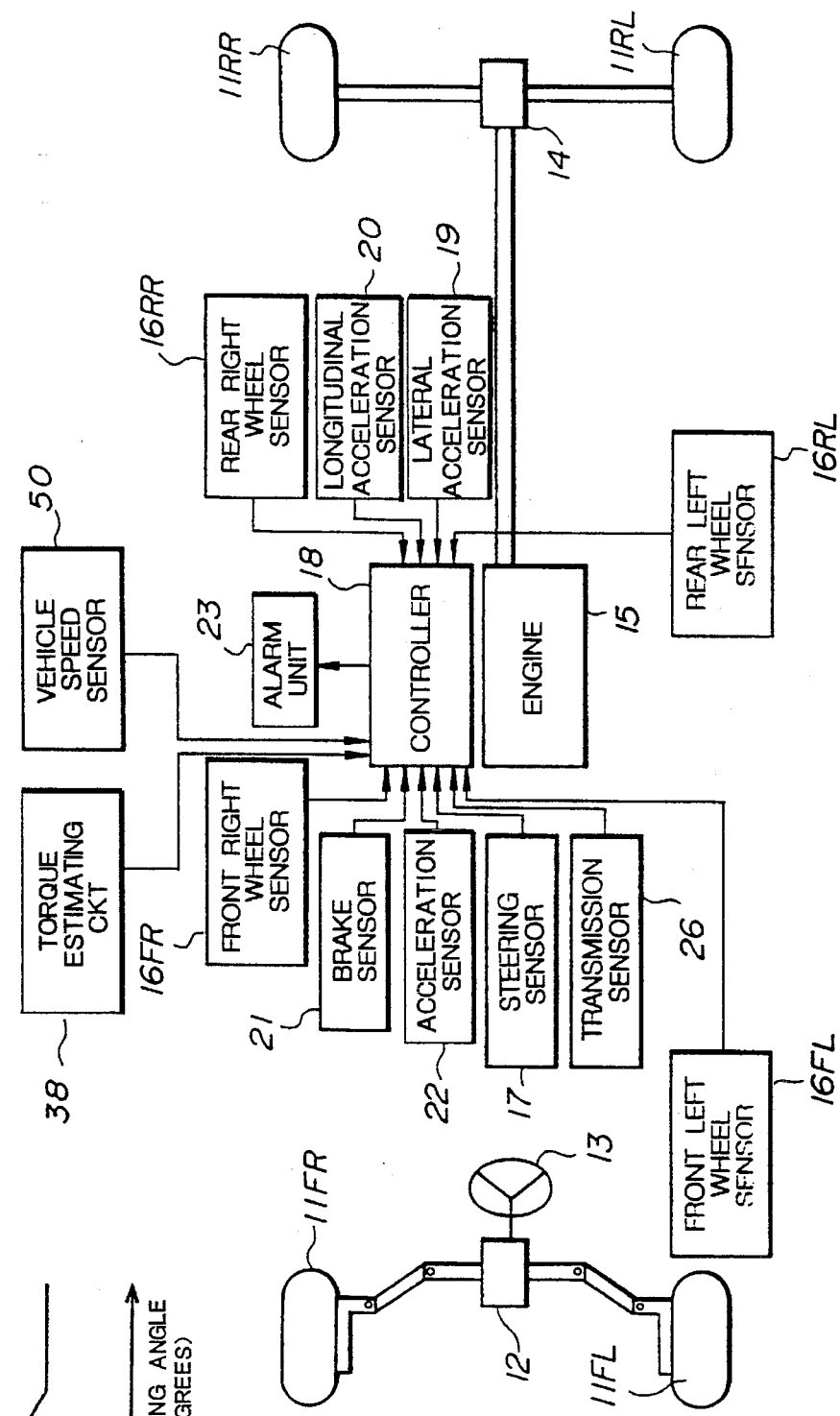
FIG. 1 is a block diagram of a system for determining a pneumatic tire pressure according to the present invention.

As shown in FIG. 1, a rear-wheel-drive motor vehicle such as an automobile has a front left road wheel 11FL, a front right road wheel 11FR, a rear left road wheel 11RL, and a rear right road wheel 11RR. The motor vehicle has a steering wheel 13 which is operatively coupled to the front left and right road wheels 11FL, 11FR through a known steering mechanism 12 for turning the front left and right road wheels 11FL, 11FR to steer the motor vehicle. The motor vehicle also has a power unit or engine 15 that is operatively connected to the rear left and right road wheels 11RL, 11RR through a final speed reducer mechanism or differential 14 for driving the rear left and right road wheels 11RL, 11RR.

A pneumatic tire pressure determining system according to the present invention is incorporated in the motor vehicle shown in FIG. 1, and includes wheel sensors 16FL, 6FR, 16RL, 16RR associated respectively with the front left road wheel 11FL, the front right road wheel 11FR, the rear left road wheel 11RL, and the rear right road wheel 11RR for individually detecting respective rotational speeds thereof, and a steering sensor 17 associated with the steering mechanism 12 for detecting a steering angle, i.e., an angle through which the steering wheel 13 has been turned. The wheel sensors 16FL, 16FR, 16RL, 16RR and the steering sensor 17 are electrically connected to a controller 18 of the pneumatic tire pressure determining system. To the controller 18, there are also electrically connected a lateral acceleration sensor 19 for detecting a lateral acceleration of the motor vehicle, i.e., an acceleration of the motor vehicle in the transverse direction thereof, a longitudinal acceleration sensor 20 for detecting a longitudinal acceleration of the motor vehicle, i.e., an acceleration of the motor vehicle in the longitudinal direction thereof, a brake sensor 21 for detecting a depressed stroke of the brake pedal of the motor vehicle, an accelerator sensor 22 for detecting a depressed stroke of the accelerator pedal of the motor vehicle, a transmission sensor 26 for detecting a gear position of the transmission combined with the power unit 15 of the motor vehicle, and an alarm unit 23 such as warning lamps, speakers, buzzers or the like. The longitudinal acceleration sensor 20 may comprise a differentiating circuit for calculating the derivatives of the rotational speeds of the road wheels, i.e., the accelerations of the road wheels.

Figure 2:
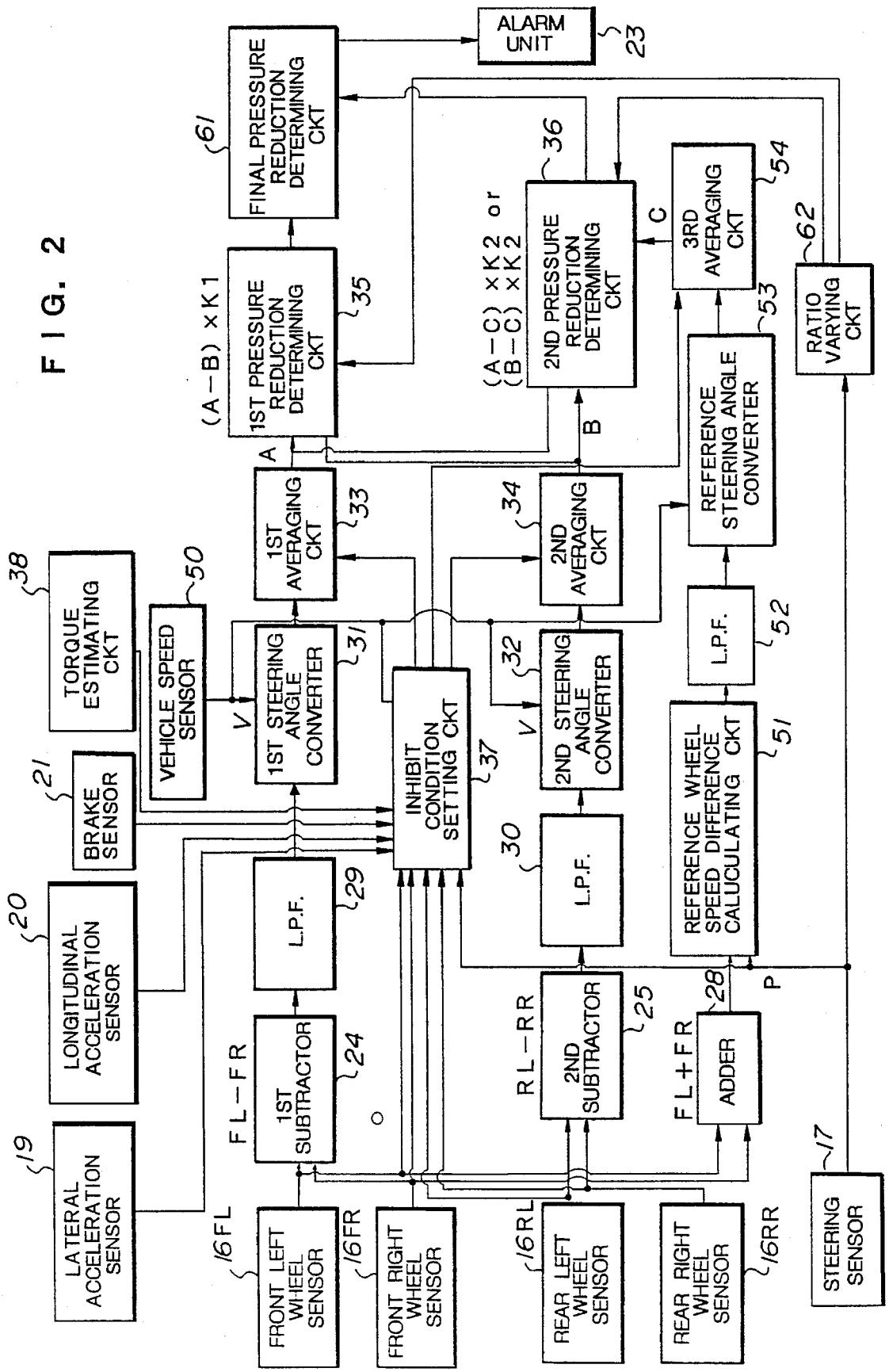
FIG. 2 is a detailed block diagram of a controller of the system shown in FIG. 1.

As shown in FIG. 2, the controller 18 has a first subtractor 24 and an adder 28 which are connected to the wheel sensors 16FL, 16FR associated with the respective front left and right road wheels 11FL, 11FR, and a second subtractor 25 which is connected to the wheel sensors 16RL, 16RR associated with the respective rear left and right road wheels 11RL, 11RR. The first subtractor 24 is connected through a low-pass filter 29 to a first steering angle converter 31. The first subtractor 24 deducts an output signal FR of the wheel sensor 16FR from an output signal FL of the wheel sensor 16FL, and outputs a differential signal (FL−FR) representative of the difference between the rotational speeds of the front left and right road wheels 11FL, 11FR. The second subtractor 25 is connected through a low-pass filter 30 to a second steering angle converter 32. The second subtractor 25 deducts an output signal RR of the wheel sensor 16RR from an output signal RL of the wheel sensor 16RL, and outputs a differential signal (RL−RR) representative of the difference between the rotational speeds of the rear left and right road wheels 11RL, 11RR.

The adder 28 is connected through a reference wheel speed difference calculating circuit 51 and a low-pass filter 52 to a reference steering angle converter 53. The steering sensor 17 is connected to apply a steering angle signal P to the reference wheel speed difference calculating circuit 51. The adder 28 adds the output signal FL of the wheel sensor 16FL and the output signal FR of the wheel sensor 16FR to each other, and outputs a sum signal (FL+FR) representative of the sum of the rotational speeds of the front left and right road wheels 11FL, 11FR.

The first steering angle converter 31 is supplied with a vehicle speed signal V from a vehicle speed sensor 50 (see also FIG. 1), and has an output terminal connected to a first averaging circuit 33. The first steering angle converter 31 calculates a steering angle from the differential signal (FL−FR) from the first subtractor 24 and the vehicle speed signal V, and applies a signal indicative of the calculated steering angle to the first averaging circuit 33. The second steering angle converter 32 is also supplied with the vehicle speed signal V from the vehicle speed sensor 50, and has an output terminal connected to a second averaging circuit 34. The second steering angle converter 32 calculates a steering angle from the differential signal (RL−RR) from the second subtractor 25 and the vehicle speed signal V, and applies a signal indicative of the calculated steering angle to the second averaging circuit 34.

The vehicle speed sensor 50 may comprise a circuit for calculating an average value of the output signals from the wheel sensors 16FL, 16FR, so that the vehicle speed is represented by the average value of the rotational speeds of the front road wheels 11FL, 11FR that are driven road wheels.

The reference wheel speed difference calculating circuit 51 calculates a differential signal {(FL+FR)−P} representing the difference between the sum signal (FL+FR) from the adder 28 and the steering angle signal P from the steering sensor 17.

The reference steering angle converter 53 is supplied with the vehicle speed signal V from the vehicle speed sensor 50, and has an output terminal connected to a third averaging circuit 54. The reference steering angle converter 53 calculates a reference steering angle from the sum signal (FL+FR) from the adder 28, the steering angle signal P from the steering sensor 17, and the vehicle speed signal V from the vehicle speed sensor 50, i.e., calculates a reference steering angle as converted from the differential signal {(FL+FR)−P} which is outputted from the reference wheel speed difference calculating circuit 51. Then, the reference steering angle converter 53 and applies a signal indicative of the calculated reference steering angle to the third averaging circuit 54.

The first and second averaging circuits 33, 34, to which an inhibit condition setting circuit 37 is connected, have respective output terminals connected to respective first and second pressure reduction determining circuits 35, 36. The first averaging circuit 33 stores output signals from the first steering angle converter 31 during a predetermined period of time, updates the oldest stored data each time an output signal is supplied from the first steering angle converter 31, and calculates the average value of the output signals from the first steering angle converter 31 during the predetermined period of time. When a determination permission signal is supplied from the inhibit condition setting circuit 37, the first averaging circuit 33 applies an average signal A that represents the average value (estimated steering angle) of the calculated steering angles during the predetermined period of time, to the first pressure reduction determining circuit 35. Similarly, the second averaging circuit 34 stores output signals from the second steering angle converter 32 during a predetermined period of time, updates the oldest stored data each time an output signal is supplied from the second steering angle converter 32, calculates the average value of the output signals from the second steering angle converter 32 during the predetermined period of time, and applies an average signal B that represents the average value (estimated steering angle) of the calculated steering angles during the predetermined period of time, to the second pressure reduction determining circuit 36 when a determination permission signal is supplied from the inhibit condition setting circuit 37.

The third averaging circuit 54, to which the inhibit condition setting circuit 37 is also connected, has an output terminal connected to the second pressure reduction determining circuit 36. The third averaging circuit 54 stores output signals from the reference steering angle converter 53 during a predetermined period of time, updates the oldest stored data each time an output signal is supplied from the reference steering angle converter 53, calculates the average value of the output signals from the reference steering angle converter 53 during the predetermined period of time, and applies an average signal C that represents the average value (estimated steering angle) of the calculated steering angles during the predetermined period of time, to the second pressure reduction determining circuit 36 when a determination permission signal is supplied from the inhibit condition setting circuit 37.

The inhibit condition setting circuit 37 has output terminals connected to the first and second averaging circuits 33, 34, as described above, and also to the third averaging circuit 54. The inhibit condition setting circuit 37 has input terminals connected to the vehicle speed sensor 50, the wheel sensors 16FL, 16FR, 16RL, 16RR, the steering sensor 17, the lateral acceleration sensor 19, the longitudinal acceleration sensor 20, the brake sensor 21, and a torque estimating circuit 38. The inhibit condition setting circuit 37 processes detected signals from these sensors and circuit, and outputs a determination inhibit signal when one of inhibit conditions is satisfied, i.e., when the vehicle speed is zero or in a low-speed range lower than a predetermined vehicle speed, or when the brake pedal is depressed to brake the motor vehicle, or when the road wheels suffer rotational vibrations as upon traveling on rough terrain, or when the lateral acceleration is not in a predetermined range, or when the steering angle is not in a predetermined range, or when the longitudinal acceleration is not in a predetermined range, or when the output torque of the engine is not in a predetermined range, and outputs a determination permission signal otherwise. The torque estimating circuit 38 estimates the output torque of the power unit or engine 15 based on the output signal from the accelerator sensor 22.

The first pressure reduction determining circuit 35 has input terminals connected to the first and second averaging circuits 33, 34, respectively, and an output terminal connected to a final pressure reduction determining circuit 61.

The first pressure reduction determining circuit 35 calculates a differential signal (A–B) representing the difference between the average signal A from the first averaging circuit 33 and the average signal B from the second averaging circuit 34, and weights the differential signal (A–B) by multiplying the differential signal (A–B) by a predetermined first ratio K1. The first pressure reduction determining circuit 35 outputs a signal {(A–B)×K1} to the final pressure reduction determining circuit 61.

The second pressure reduction determining circuit 36 has input terminals connected to the first, second, and third averaging circuits 33, 34, 54, respectively, and an output terminal connected to the final pressure reduction determining circuit 61.

The second pressure reduction determining circuit 36 calculates a differential signal (A–C) representing the difference between the average signal A from the first averaging circuit 33 and the average signal C from the third averaging circuit 34, and a differential signal (B–C) representing the difference between the average signal B from the second averaging circuit 33 and the average signal C from the third averaging circuit 34, and weights the differential signals (A–C), (B–C) by multiplying the differential signals (A–C), (B–C) by a predetermined second ratio K2. The second pressure reduction determining circuit 36 outputs signals {(A–C)×K2}, {(B–C)×K2} to the final pressure reduction determining circuit 61.

The final pressure reduction determining circuit 61 is supplied with both a sum signal {(A–B)×K1+(A–C)×K2} representing the sum of the signal {(A–B)×K1} and the signal {(A–C)×K2} and a sum signal {(A–B)×K1+(B–C)×K2} representing the sum of the signal {(A–B)×K1} and the signal {(B–C)×K2}. The final pressure reduction determining circuit 61 determines the pneumatic tire pressures based on the supplied signals.

The first and second ratios K1, K2 are determined such that the sum of these first and second ratios K1, K2 is equal to 1 (K1+K2=1). The first and second ratios K1, K2 are written in respective memories (not shown), such as RAMs, in the first and second pressure reduction determining circuits 35, 36. The first and second ratios K1, K2 are set to predetermined values that are suitable for the motor vehicle.

The output terminal of the steering sensor 17 is connected to a ratio varying circuit 62 whose output terminals are connected respectively to the first and second pressure reduction determining circuits 35, 36.

The ratio varying circuit 62 has a memory storing a data table which contains various combinations of first and second ratios K1, K2 corresponding to various steering angle signals P. In response to a detected steering angle signal P from the steering sensor 17, the ratio varying circuit 62 reads a combination of first and second ratios K1, K2 which corresponds to the detected steering angle signal P, and supplies the first and second ratios K1, K2 respectively to the first and second pressure reduction determining circuits 35, 36. The first and second ratios K1, K2 written in the memories of the first and second pressure reduction determining circuits 35, 36 are replaced with the first and second ratios K1, K2 supplied from the ratio varying circuit 62 to the first and second pressure reduction determining circuits 35, 36.

Figure 3:
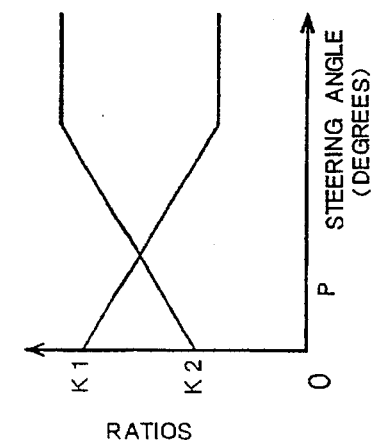
FIG. 3 is a graph showing ratio vs. steering angle characteristics of the system shown in FIG. 1.

FIG. 3 shows the relationship between the first and second ratios K1, K2 and the steering angles P stored in the data table of the ratio varying circuit 62. As shown in FIG. 3, the first ratio K1 linearly decreases and the second ratio K2 linearly increases as the steering angle P increases. When the steering angle P reaches and increases beyond a predetermined value, the first and second ratios K1, K2 become and remain substantially constant. While the steering angle signal P is used as a running condition in the ratio varying circuit 62 in the illustrated embodiment, a yaw rate or a lateral acceleration may be used as a running condition in the ratio varying circuit 62.

The final pressure reduction determining circuit 61 has an output terminal connected to the alarm unit 23. The alarm unit 23 may comprise warning lamps or buzzers corresponding to the respective pneumatic tire pressures of all the road wheels. In response to a drive signal from the final pressure reduction determining circuit 61, the alarm unit 23 selectively energizes or turns on and off the warning lamps, the speakers, or the buzzers to warn the driver of the motor vehicle.

The pneumatic tire pressure determining system according to the present invention does not determine whether a pneumatic tire pressure has dropped or not when at least one of the following conditions (inhibit conditions) a, b, c, d, e, f, g is satisfied, i.e., when the motor vehicle operates under a stable condition:

a: the motor vehicle is not running;
  b: the motor vehicle is braked;
  c: the motor vehicle is running on rough terrain;
  d: the lateral acceleration of the motor vehicle is not within a predetermined range;
  e: the steering angle is not in a predetermined range;
  f: the longitudinal acceleration of the motor vehicle is not within a predetermined range; and
  g: the engine output torque is not within a predetermined range.

Given the above conditions a, b, c, d, e, f, g, the system can determine pneumatic tire pressures highly accurately and reliably.

Since a reduction in pneumatic tire pressures is determined by the first and second pressure reduction determining circuits 35, 36 based on the first and second ratios K1, K2, the pneumatic tire pressure determining system can avoid problems which would otherwise occur if it were determined by only one of the first and second pressure reduction determining circuits 35, 36. Therefore, the pneumatic tire pressure determining system is capable of determining pneumatic tire pressures highly accurately even while the motor vehicle is making a turn or running straight when the steering system tends to suffer a mechanical error.

Inasmuch as the first and second ratios K1, K2 are varied depending on the running condition of the motor vehicle, the pneumatic tire pressure determining system can determine pneumatic tire pressures highly accurately for increased reliability even when the running condition of the motor vehicle varies.

If one of the inhibit conditions is satisfied, the pneumatic tire pressure determining system does not determine pneumatic tire pressures. The accuracy of operation of the pneumatic tire pressures is therefore increased for higher reliability.

The system according to the present invention has been illustrated as being incorporated in a rear-wheel-drive motor vehicle. However, the principles of the present invention are also applicable to a front-wheel-drive motor vehicle by switching around the front wheel sensors 16FL, 16FR and the rear wheel sensors 16RL, 16RR.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. A system for determining a pneumatic tire pressure of road wheels on a motor vehicle, comprising:

first differential speed means for detecting a front rotational speed difference between rotational speeds of front left and right road wheels of the motor vehicle;

second differential speed means for detecting a rear rotational speed difference between rotational speeds of rear left and right road wheels of the motor vehicle;

running condition detecting means for detecting a running condition of the motor vehicle;

reference differential speed calculating means for calculating a reference rotational speed difference between rotational speeds of the front left and right road wheels based on an output signal from said running condition detecting means;

first pressure reduction determining means for comparing said front rotational speed difference and said rear rotational speed difference to determine a pneumatic tire pressure reduction of said front left and right road wheels or said rear left and right road wheels;

second pressure reduction determining means for comparing said front rotational speed difference or said rear rotational speed difference and said reference rotational speed difference to determine a pneumatic tire pressure reduction of one of said front left and right road wheels or said rear left and right road wheels; and final pressure reduction determining means for determining a pneumatic tire pressure reduction from output signals from said first pressure reduction determining means and said second pressure reduction determining means based on at least a combination of a first ratio in said first pressure reduction determining means and a second ratio in said second pressure reduction determining means corresponding to one of; (a) at least a steering angle, (b) at least a yaw rate, and (c) at least a lateral acceleration of said motor vehicle.

2. A system according to claim 1, further comprising ratio varying means for varying said first ratio and said second ratio based on the running condition detected by said running condition detecting means.

3. A system according to claim 1, further comprising inhibit means for disabling said first pressure reduction determining means, said second pressure reduction determining means, and said final pressure reduction determining means if at least one of the following conditions a, b, c, d, e, f, g is satisfied:

a: the motor vehicle is not running;

b: the motor vehicle is braked;

c: the motor vehicle is running on rough terrain;

d: a lateral acceleration of the motor vehicle is not within a predetermined range;

e: a steering angle of the motor vehicle is not in a predetermined range;

f: a longitudinal acceleration of the motor vehicle is not within a predetermined range; and g: an engine output torque of the motor vehicle is not within a predetermined range.

* * * * *